United States Patent Office 3,761,353
Patented Sept. 25, 1973

3,761,353
ENZYMATIC PROTEIN SOLUBILIZATION
Frederick F. Noe, Southampton, and William T. Faith, Jr., Warminster, Pa., assignors to Rohm and Haas Company, Philadelphia, Pa.
No Drawing. Continuation of abandoned application Ser. No. 772,833, Nov. 1, 1968. This application Jan. 13, 1972, Ser. No. 217,640
Int. Cl. A23j 1/00, 3/00; C12d 13/06
U.S. Cl. 195—29               5 Claims

ABSTRACT OF THE DISCLOSURE

Disclosed herein is a novel method of solubilizing and hydrolyzing isolated protein so as to render such useful for the preparation of food and industrial products. In accordance therewith, isolated protein is contacted with an enzymatic composition comprising a bacterial enzyme alone or in combination with a fungal enzyme.

---

This is a continuation of application Ser. No. 772,-833, filed Nov. 1, 1968, and now abandoned.

This invention relates to a novel method of rendering isolated protein more utilizable. More specifically, this invention relates to an enzymatic method of treating isolated protein. Still more specifically, this invention relates to an enzymatic means of solubilizing and hydrolyzing isolated protein. Further, this invention relates to novel enzyme preparations and compositions useful for solubilizing and hydrolyzing isolated protein. Still further, this invention relates to novel products obtained from such solubilized and hydrolyzed protein.

By way of definition the recitation "isolated protein" as employed herein refers to protein which has been separated by chemical and/or physical means for its natural state and which is essentially insoluble in water. The term "solubilize" and/or any of its various grammatical forms including "solubilization," "solubilizing," "solubilized," etc. as utilized herein in reference to an isolated protein means that such protein is in an aqueous medium to the extent that such will form a colloidal system but being precipitable therefrom in an essentially unaltered form. In addition, the term "hydrolyze" and/or any of its various grammatical forms including "hydrolyzation," "hydrolyzing," "hydrolyzed," etc. may be used in reference to an isolated protein or an isolated protein which has been solubilized. In this respect it shall mean that when such protein is incorporated or solubilized in an aqueous solution and hydrolyzed, it is chemically altered and rendered more difficultly precipitable therefrom.

Protein is, of course, a basic food material. Relatively large amounts of available protein are found in food substances, such as for example, meat, soybeans, lima beans, alfalfa, rice, wheat, corn, peas, milk, coconut, peanuts, linseed, cotton seed, rape seed, fish derivatives and the like. As previously indicated, these food substances and untold other protein suppliers such as algae, oil grown microorganisms, chicken feathers and the like, all of which can be referred to as proteinaceous materials, constitute significant sources of protein. However, such protein is often difficult to utilize because of its relative insolubility in water even after separation by enzymatic, chemical and/or physical means. Hence, such protein is often unacceptable or difficult to employ in the preparation of drinks, spreads, industrial adhesives etc.

While it is possible in many instances to solubilize isolated protein by alkaline treatment, this procedure is generally undesirable especially when the resulting protein is to be utilized as a food or food supplement. Alkaline treatment often destroys certain essential amino acids which are present in the protein. Thus, this tends to detract from the nutritional characteristics of such proteins. Furthermore, such alkaline treatment is often uneconomical and the protein resulting therefrom is lacking in many of the properties which would render it suitable for satisfactory utilization as a food material. Consequently, there has been a continual search for a means whereby isolated protein could be readily and economically solubilized.

Similarly, substantial efforts have been expended in seeking a means whereby isolated protein could also be hydrolyzed. The accomplishment thereof would make possible the preparation of useful products which were heretofore inadequate for their purpose or even unknown. Nutritious protein-containing drinks would be exemplary of such products. Accordingly, the discovery of the present invention which makes possible the solubilization and hydrolyzation of isolated protein constitutes a significant and long sought after advance in the art.

Specifically, the present invention provides an economical non-deleterious enzymatic method for solubilizing and hydrolyzing isolated protein. Still more specifically, the present invention comprises: (1) a process for contacting isolated protein with an enzyme preparation in an amount which is effective to solubilize such protein; and (2) a process for contacting isolated or solubilized protein with an enzyme preparation in an amount which is effective to hydrolyze such protein.

The enzyme preparation employed in solubilizing isolated protein may be referred to as "Solutase." Such is derived from a bacterial organism and is further characterized by being able to render an isolated protein dispersible in water to the extent that a colloidal system will result. Furthermore, the protein so dispersed will be essentially recoverable therefrom by precipitation.

This ability of a Solutase enzyme preparation to solubilize isolated protein shall be referred to as "Solutase Activity." The degree thereof is expressed in "Solutase Units" (S.U.). One S.U. is that amount of enzyme preparation which will disperse 1 gm. of isolated protein in 100 ml. of water in 15 minutes at a pH of 7.8 when the mixture is agitated at 275 r.p.m. at 40° C. By disperse is meant, of course, the forming of a colloidal system with the solubilized protein being precipitable therefrom. Thus the Solutase Activity of an enzyme preparation within the scope of this invention may be determined by observing the amount thereof required to disperse a known amount of isolated protein subsequently recoverable from solution by precipitation. Conversely, the Solutase Activity of an enzyme preparation may be determined by observing the amount of protein which will be dispersed by a known amount of enzyme preparation and recoverable by precipitation. The techniques necessary for making these determinations are, of course, well known to those skilled in the art.

On the other hand, hydrolyzation of the isolated protein and particularly isolated protein which has been solubilized is achieved by contacting such with a fungal enzyme preparation. This fungal enzyme preparation is referred to as "Hydrolase" and is characterized by being capable of altering the protein to the extent that such will not precipitate from an aqueous solution thereof.

This ability of a Hydrolase enzyme preparation to hydrolyze isolated protein and solubilized isolated protein may, for the purposes hereof, be termed "Hydrolse Activity." The degree thereof is expressed in "Hydrolase Units" (H.U.). One H.U. is that amount of enzyme preparation which will render 1.0 gram of solubilized protein unprecipitable when such is contacted for 16 hours at 40° C. while being agitated at 275 r.p.m. and maintained at a pH of 6.2. Thus, the Hydrolase Activity of an enzyme preparation can be readily determined.

As noted previously, the Solutase enzyme preparation is derived from a bacterial organism.

Generally and preferably, this will be a growing culture of Bacillus including, of course, the various strains and mutants thereof. Some typical members of the Bacillus genus include for example: *B. subtilis, B. mycoides, B. amyloliquifaciens, B. cereus, B. macerans, B. megaterium, B. sphaericus, B. circulans* and the like. In this respect, a particularly preferable organism for the production of Solutase is *B. subtilis*.

Hydrolase, as noted hereinbefore, is of fungal origin. Generally, it is derived from a growing culture of Aspergillus and particularly, from the *Aspergillus oryzae-niger* group. Typically, this will include microorganisms such as *Aspergillus oryzae* or *Aspergillus niger* with the latter organism being preferred.

Numerous strains and mutants of both the Bacillus and Aspergillus organisms utilizable in accordance with this invention are maintained and available from public culture collections, such as, for example, the American Type Culture Collection in Rockville, Md.

Both the Solutase and Hydrolase producing organisms may be grown in either a liquid submerged or surface culture on a medium comprising a utilizable source of energy, assimilable carbon and nitrogen. Of course, any of the regularly employed growth factors and mineral salts or combinations thereof may also be incorporated in such culture media.

Typically, such media may include the well-known Difco Nutrient Broth, as well as mixtures containing sucrose, dextrose, maltose, corn starch, corn steep liquor, corn distiller's dry solubles, wheat bran, wheat middlings, soybean meal, gelatin, meat, bone, fish scraps, blood, monosodium phosphate, monoammonium phosphate, sodium citrate, magnesium sulfate, calcium chloride, potassium chloride, molasses fortified with high protein nutrients and the like. While corn starch and soybean meal or other protein containing soybean derivatives are especially desirable constituents in the culture media, numerous other protein containing substances such as, for example, corn meal, corn distiller's dry soluble, rape seed meal, peanuts and the like are similarly utilizable. A particularly efficacious liquid submerged medium would comprise 0.5 to 6.0% corn distiller's dry solubles, 2 to 10% corn starch, 0.5 to 2.0% monoammonium phosphate and 0.05 to 3.0% calcium chloride, 0.5 to 3.0% potassium chloride and 0.5 to 2.0% sodium citrate.

A still more preferable medium would comprise 1.0 to 3.0% corn distiller's dry solubles, 5 to 7% corn starch, 0.7 to 1.0% monoammonium phosphate and 0.1 to 0.2% calcium chloride, 1.0 to 2.0% potassium chloride and 0.7 to 1.2% sodium citrate.

Salts such as monosodium, potassium or ammonium phosphate and the like are usually incorporated in such culture media to the extent of 0.001 to 5% and preferably 0.1 to 2% by weight of the total medium. These salts are advantageous in preventing a rapid rise in pH during the growth of the organism. Likewise, the addition of carbohydrates will also prevent an excessive increase in pH during enzyme production. Carbohydrates will typically be in the form of molasses, starch, acid or enzymatically modified starch, dextrose, sucrose or combinations thereof.

Substantial latitude with respect to the pH range of the culture medium during enzyme production is allowable. However, it has been found that enzyme preparations possessing relatively high levels of Solutase and Hydrolase Activity will be obtained when the pH is in the range of 4.5 to 8.5, and preferably 5.5 to 7.5.

Similarly, optimal enzyme yields necessitate that the growing cultures be maintained at a temperature in the range of 20° to 35° C. and preferably in the range of 30° to 35° C. However, as noted hereinbefore, variances will be allowed, but the yield and activity of enzymes so obtained may be deleteriously affected.

Maximum enzyme production will be obtained within 48 to 96 hours, depending, of course, on such factors as the particular organisms being grown, the total concentration of nutrient solids, pH, temperature, aeration, agitation and the like. However, under the preferred conditions recited herein, the growing cycle may be reduced to 18 hours or even less. Maintenance of the organism under the conditions described herein for periods of time in excess of 96 hours will generally not be harmful. However, it is almost always economically preferable to harvest the enzyme preparations as soon as possible after completion of the production cycle. Any of the methodology within the knowledge of those skilled in the art may be utilized in determining when the production cycle is completed. When desired, Solutase or Hydrolase Activity of the crude culture may be determined at regular intervals by the means described hereinbefore. Harvesting of the enzyme should proceed when the particular activity for that culture has essentially reached its peak or thereabout.

In general, growing of the organisms in question on a surface culture will necessitate essentially the same temperature and pH conditions indicated for liquid submerged cultures. However, the medium utilized in a surface culture will usually differ somewhat from that of a liquid submerged culture. For instance, a preferred medium would comprise defatted soybean flakes, corn starch and water.

Numerous processes are available and may be readily employed for the concentration of the enzyme preparations from the crude culture after completion of the growing cycle. The enzyme preparation can be extracted with water or the whole culture may be dried and ground. Typically, concentration will include the removal of water from the whole cultures or filtered crude cultures by spray drying, vacuum concentration, lyophilization, or drying on an inert carrier such as lactose, inorganic salts, diatomaceous earth, combinations thereof and the like. Alternatively, the enzyme preparations under consideration may be precipitated with alcohol and ammonium sulfate. This latter procedure will generally result in products having a relatively high degree of activity and purity which may be even more accentuated by carrying out such precipitation under refrigeration conditions. In that the enzyme preparations disclosed herein are utilized to a great extent in the production of food or feed type materials this increased purification will often not only be desirable but necessary. Of course, separation of the enzyme preparations from the crude culture is not absolutely necessary, since they may be effectively employed in that form. The separation and degree of purification will depend to a great extent upon the contemplated ultimate use of such enzyme preparations.

Solutase and Hydrolase compositions are usually prepared by combining the respective enzyme preparations with an inert or substantially inert carrier. By "carrier" is meant any substance or combination of substances which can be utilized to dissolve, dilute, disperse, disseminate or diffuse the enzyme preparation without substantially impairing its effectiveness for the solubilization and/or hydrolyzation of protein. The amount of enzyme preparation or preparations combined with a carrier in any composition will vary with the desired Solutase and/or Hydrolase Activity thereof. Generally, such compositions will comprise Solutase and/or Hydrolase in the range of 1 to 99% and preferably 5 to 25% by weight of the total composition. The makeup of any particular composition in accordance herewith will depend first of all on whether such is limited to Solutase and Hydrolase Activity or a combination thereof. Secondly, the activity level of the enzyme preparations themselves and the desired resultant activity will also be determinative of the ratio between enzyme preparation or preparations and carrier.

Usually, a Solutase composition will have an activity in the range of 1.0 to 1000 S.U. per gram. However, preferably such compositions will have an activity in the range of 250 to 650 S.U. per gram. Similarly, Hydrolase compositions will generally have an activity in the range of 0.1 to 500 H.U. per gram and preferably 10 to 100 H.U. per gram. Compositions having both Solutase and Hydrolase Activity will usually evidence solubilization and hydrolyzation characteristics within the ranges noted hereinabove for those compositions possessing a single such activity.

A typical composition in accordance with this invention would be prepared by precipitating Solutase and Hydrolase with alcohol from their respective crude culture filtrates which were grown in the manner previously described. These precipitates are then incorporated into lactose so as to constitute 20% of the total weight of such composition, with the Solutase and Hydrolase being present in a ratio of about 1 to 1. Likewise, the Solutase and Hydrolase enzyme preparations may be incorporated into separate lactose carriers and then combined for use in accordance with the process of this invention. In the alternative, the individual Solutase and Hydrolase compositions may be utilized separately in the process of makeup and preparation of the enzymatic compositions of this invention which would be apparent to one skilled in the art are, of course, embraced within the scope thereof.

As noted heretofore, the process of this invention comprises contacting isolated protein with a Solutase and/or Hydrolase. The amount of Solutase and/or Hydrolase to be utilized in the process should be such as to be effective to solubilize and/or hydrolyze the protein.

Generally and preferably, this process will be carried out in an aqueous medium. The amount of water employed therein will, of course, vary with the substrate to be treated, that is, the isolated protein. In most circumstances, a minimal amount of water will be utilized. Usually, this will vary on a weight basis of from 5 to 30 parts water to 1 part isolated protein. A preferable water to protein ratio would range from 10 to 20 parts water to 1 part protein.

In the process of this invention, the effective amount of Solutase and/or Hydrolase will, of course, vary not only with the activities of the enzyme preparations, but also with the particular protein to be treated in addition to related processing conditions. It has been found that for each gram of protein about 0.1 to 100 and preferably 1.0 to 25 S.U. will completely solubilize such. Also, to completely hydrolyze each gram of isolated or solubilized protein, about 0.01 to 100 and preferably 0.1 to 50 H.U. will be utilized. However, depending upon the various processing conditions etc., it may be possible to use less than 0.1 S.U. and/or 0.01 H.U. per gram of protein. Similarly, in some situations it may require more than 100 S.U. and/or 50 H.U. The determination of the exact amount of S.U. and/or H.U. required under any given conditions is, of course, within the skill of one knowledgeable in the art.

In general, the process in question is carried out at a pH in the range of about 4.8 to 10.8, and preferably in the range of about 6.0 to 7.8. Depending upon the protein being treated and the like, various substances can be incorporated therein for pH adjustment and maintenance. Typically, these would include ammonium sulfate, ammonium hydroxide, sodium hydroxide, sodium carbonate, hydrochloric acid, sulfuric acid, actic acid, lactic acid, adipic acid and the like. It is also highly desirable to maintain the protein-containing aqueous medium while being contacted with Solutase and/or Hydrolase at a temperature in the range of about 20° to 60° C. and preferably at about 30° to 40° C. Usually, the solubilization and/or hydrolyzation process will proceed more rapidly at higher temperatures and under gentle agitation. Nevertheless, the time necessitated for any particular solubilization and/or hydrolyzation by means of the process disclosed herein will vary with the protein, the concentration of Solutase and/or Hydrolase, their activity and the other conditions noted herein. For the most part, satisfactory protein solubilization depending, of course, upon the degree thereof desired will require at least five minutes and generally as much as 1 to 5 hours or longer. Hydrolyzation in accordance with this invention usually necessitates about 6 hours and generally as much as 16 hours or longer. Under preferable conditions complete protein solubilization and hydrolyzation will be accomplished within 10 to 12 hours.

As noted hereinbefore, the process of this invention is especially adapted to solubilizing and/or hydrolyzing isolated protein derived from soybeans. Consequently, by means of this invention, it is now possible to utilize soybeans in the preparation of various foods, food additives, food supplements and the like. More specifically, it is now possible to solubilize and hydrolyze isolated protein derived from soybeans and to formulate such into drinks both carbonated and uncarbonated, baby foods, whipping materials, frostings, toppings and the like. In addition, such protein may now be rendered useful for the preparation of adhesives, binders and numerous other industrial products.

A particularly advantageous aspect of the present invention involves the preparation of nutritious drinks containing soybean protein. Prior to this invention, such drinks were lacking in uniformity and aesthetic appeal since the protein therein tended to settle out of the suspension. However, by now, treating the isolated protein derived from soybeans in accordance with this invention, such protein is readily solubilized and/or hydrolyzed and then the necessary additives may be incorporated therewith. For example, isolated protein derived from soybeans is treated with a Solutase and Hydrolase so as to completely solubilize and hydrolyze such. Thereafter, this hydrolyzed protein is mixed with water, flavoring and vegetable coloring to suit the taste of the consumer. Such may then be utilized in that manner or additionally carbonated so as to constitute a refreshing soft drink which is also nutritious. Similarly, protein derived from soybeans may be solubilized with Solutase and then whipped into a consistency suitable for toppings. Of course, prior to such whipping, the necessary coloring and flavoring should be added to the protein so as to provide for a utilizable material upon recovery hereof. Hence, it is evident that this invention has multitudinous uses and applications, particularly in the food industry.

For a more thorough understanding of this invention and some of its embodiments, the following examples are offered by way of illustraiton and not by way of limitation.

EXAMPLE 1

100 ml. aliquots of an aqueous medium composed of 2% corn distiller's dry solubles, 6% corn starch, 0.6% monoammonium phosphate, and 0.2% calcium chloride, 2% potassium chloride and 1% sodium citrate are added to 1-liter wide-necked Erlenmeyer flasks which are capped with 3 milk filter discs.

Following sterilization of the medium at 15 p.s.i.g. for 30 minutes, the flasks are cooled and inoculated to a final 2% concentration with an aqueous suspension prepared from a *Bacillus subtilis* culture grown on potato dextrose agar for 48 to 72 hours. The flasks are then incubated on a shaker rotating at 260 r.p.m. with an eccentric of 2¼" at 35–37° C. at 50% relative humidity. The initial pH is 7.0.

After 48 hours, the cultures are removed from the shaker ready for harvesting. A concentrate of the enzyme preparation is obtained by adding with constant mixing three volumes of ethanol at 4° C. to the crude filtrate of the above-described whole culture. Thus, the enzyme preparation is precipitated therefrom. This Solutase is then collected by filtration and dried in vacuo at 30–35° C. which renders it suitable for storage.

A 5 g. portion of the Solutase is combined with 20 g. of lactose. The resulting composition has an activity of 300 S.U. per gram.

EXAMPLE 2

Approximately 200 parts by weight of wheat bran and 100 parts of wheat middlings are mixed with 400 parts of water. This mixture is then sterilized by heating then subsequently cooled. Thereupon, a heavily sporulated culture of *Aspergillus oryzae* (A.T.C.C. No. 14,605) in an amount equal to 0.1% by weight of the above mixture is thoroughly dispersed therein. The temperature is raised to 35° C. and maintained in that manner for 16 hours to promote rapid growth of the fungus. Thereafter, it is held for 48 hours at 28° C. The resulting culture is dried in a current of warm air and then extracted with water. Four volumes of ethyl alcohol are added per volume of extract. The resulting precipitate is centrifugally settled, rinsed with alcohol and dried in a current of warm air at 60° C. This fungal enzyme preparation is then combined with sufficient lactose so as to result in a composition having an activity of 10 H.U. per gram.

EXAMPLE 3

In each of 10 flakes there is suspended in 100 ml. of tap water 3 grams of isolated soybean protein. This suspension is then adjusted to a pH of 7.8 with dilute sodium hydroxide. In five of the flakes, there is added 1.75 mg. of the precipitated Solutase enzyme preparation of Example 1. All of the flasks are then agitated at 275 r.p.m. at 40° C. for varying amounts of time as indicated in Table I following and then removed and filtered under reduced pressure through one layer of Whatman No. 42 filter paper. The amount of insoluble protein on the filter paper is determined by dry weight and the amount of solubilized protein in the filtrate is calculated by weight difference. This protein-containing filtrate is then adjusted to a pH of 4.5 with lactic acid to reprecipitate any isoelectric protein therein. This precipitate of isoelectric protein was collected by centrifugation, dried and weighed. Table I sets forth the makeup and results of this procedure.

TABLE I

| Sample | Time (min.) | Total isolated protein solubilized (gm.) | Isoelectric protein recovered (gm.) |
| --- | --- | --- | --- |
| 1. Water control | 5 | 0.41 | 0.33 |
| 2. Water control | 10 |  | 0.26 |
| 3. Water control | 15 | 0.44 | 0.23 |
| 4. Water control | 20 | 0.37 | 0.26 |
| 5. Water control | 30 | 0.35 | 0.22 |
| 6. With enzyme | 5 | 1.79 | 0.76 |
| 7. With enzyme | 10 | 2.07 | 1.09 |
| 8. With enzyme | 15 | 2.32 | 1.36 |
| 9. With enzyme | 20 | 2.57 | 1.71 |
| 10. With enzyme | 30 | 2.61 | 1.83 |

It is evident from Table I that the isolated protein is readily solubilized when treated with a Solutase.

EXAMPLE 4

In each of 5 flasks 3 grams of isolated soybean protein is suspended in 100 ml. of tap water. This suspension is then adjusted to a pH of 6.2 with dilute lactic acid. In three of the flasks, the Solutase of Example 1 and the Hydrolase of Example 2 are added simultaneously in the proportions hereinafter set forth in Table II. The percentage concentration of each enzyme preparation is based on the weight of the isolated protein suspended in the water. All of the flasks are then agitated at 275 r.p.m. at 40° C. for either 16 or 24 hours as indicated and then removed and filtered under reduced pressure through one layer of Whatman No. 42 filter paper. The amount of insoluble protein on the filter paper is determined by dry weight and the amount of solubilized protein in the filtrate is calculated by weight difference. To this filtrate there is added an equal volume of cold 10% trichloroacetic acid (TCA) to reprecipitate any isoelectric protein therein. A precipitate is apparent only in the non-enzyme treated samples. Such is removed by centrifugation and all of the filtrates are then analyzed for protein nitrogen by the Kjeldahl Method of analysis so as to determine the percent of the protein solubilized which was hydrolyzed. Table II sets forth the results thereof.

TABLE II

| Enzyme preparation—(percent by weight of isolated soybean protein) | | Time (hr.) | Isolated protein Solubilized (gm.) | Isoelectric protein precipitated from filtrate (gm.) | Percent of protein solubilized which was hydrolyzed |
| --- | --- | --- | --- | --- | --- |
| Solutase | Hydrolase | | | | |
| None | None | 16.0 | 1.35 | 0.092 | 83.0 |
| 0.058 | 0.333 | 16.0 | 2.13 | 0.00 | 95.5 |
| 0.580 | 0.333 | 16.0 | 2.40 | 0.00 | 100.0 |
| None | None | 24.0 | 1.48 | 0.084 | 81.0 |
| 0.580 | 0.333 | 24.0 | 2.43 | 0.00 | 95.0 |

Thus, it is amply demonstrated that isolated protein may be readily solubilized and hydrolyzed when treated with Solutase and Hydrolase.

The same procedure employed above is carried out except that the Hydrolase is incorporated into the protein suspension one hour subsequent to the addition of the Solutase. Nevertheless, the isolated protein is similarly solubilized and hydrolyzed.

EXAMPLE 5

In an Erlenmeyer flask containing 200 ml. of water there is suspended 6 g. of isolated soy protein. To this suspension there is added 0.1 g. of the Solutase composition (300 S.U./gm.) of Example 1 and 0.1 g. of the Hydrolase composition (10 H.U./gm.) of Example 2. This suspension is then maintained at 40° C. for 16 hours at a pH of 6.2 and rotated at 275 r.p.m. Thereupon, such is filtered through Whatman No. 42 filter paper. To 50 gms. of the filtrate resulting therefrom there is added 10 gms. of sucrose and 0.1 gm. of food coloring. After mixing, this yields a highly nutritional and tasty drink. Another 50 gms. sample of the filtrate prepared above is also combined in the same manner with sucrose and coloring. However, in addition this mixture is then treated with carbon dioxide so as to result in a tasty and nutritional carbonated drink.

Solubilized and hydrolyzed protein such as employed above in the preparation of nutritious soft drinks are similarly utilized to fortify the following:

(1) Acidic citrus juices
(2) Breakfast cereals
(3) Baby formulas
(4) Soups
(5) Beers
(6) Dietary foods
(7) Bread, macaroni and noodles.

EXAMPLE 6

In an Erlenmeyer flask containing 200 ml. of water there is suspended 40 g. of isolated soy protein. To this suspension is added 10.0 mg. of the Solutase enzyme preparation of Example 1. This suspension is then maintained at 40° C. for 30 minutes at a pH of 7.8 and rotated at 275 r.p.m. Thereupon, such is filtered through Whatman No. 42 filter paper. To 50 gms. of the filtrate resulting therefrom there is added 10 gms. of sucrose and 0.1 gm. of food coloring. This mixture is then whipped so as to yield a highly nutritional and tasty topping material.

EXAMPLE 7

In a manner similar to that employed in Example 1, a Solutase is prepared by utilizing a *Bacillus mycoides* microorganism. A composition having an activity of 250 S.U. per gram is prepared by combining 10 g. of the enzyme preparation with 30 g. of lactose.

EXAMPLE 8

In a manner similar to that employed in Example 2, a Hydrolase is prepared by utilizing an *Aspergillus niger* microorganism. The enzyme preparation so obtained is combined with lactose at a ratio of 1 to 5 respectively so as to result in a composition having an activity of 20 H.U. per gram.

EXAMPLE 9

Ten grams of an isolated protein concentrate derived from fish is suspended in 100 ml. of water. To this suspension is added 0.1 gm. of the Solutase enzyme preparation of Example 1. This suspension is then maintained at 40° C. under gentle agitation for 30 minutes. This results in a solubilized fish protein solution. To 20 ml. of this solubilized protein solution is added 0.05 gm. of the Hydrolase enzyme preparation of Example 2. This mixture is maintained for 20 hours at 40° C. with agitation. Examination thereof at the end of this period shows that the fish protein has been hydrolyzed.

In a similar manner another 10 gram sample of isolated fish protein was solubilized and hydrolyzed by treatment with 300 mg. of the Solutase composition of Example 7 and 250 mg. of the Hydrolase composition of Example 8.

What is claimed is:
1. A process of solubilizing and hydrolyzing protein which comprises
   (a) forming an aqueous suspension of said protein,
   (b) adjusting the pH of the suspension to a value between about 6.0 and 7.8,
   (c) adjusting the temperature of the suspension to a temperature in the range of about 20° to 60° C.,
   (d) contacting the suspension with at least two enzyme preparations in an amount effective for solubilizing and hydrolyzing said protein, wherein one of said enzyme preparations is characterized by being derived from a *Bacillus subtilis* and by being able to render an isolated protein dispersible in water to the extent that a colloidal system will result from which said isolated protein is precipitable therefrom in an essentially unaltered form by adjustment of the pH to the isoelectric point and is present in a concentration of at least 0.1 S.U. per gram of protein and wherein the other enzyme preparation is characterized by being derived from an *Aspergillus oryzae* or *niger* and by being capable of altering solubilized protein to the extent that said protein will not precipitate from an aqueous solution thereof and is present in a concentration of at least 0.01 H.U. per gram of protein, and
   (e) maintaining said suspension in contact with said two enzyme preparations for a period of at least about 6 hours whereby a nutritious aqueous solution of solubilized and hydrolyzed isolated protein is obtained.

2. A process according to claim 1 wherein said isolated protein is contacted by both enzyme preparations simultaneously.

3. A process according to claim 1 wherein said step (c) temperature is in the range of about 30 to 40° C.

4. A process according to claim 1 wherein the isolated protein which is solubilized and hydrolyzed is derived from soybeans.

5. A process according to claim 1 wherein the isolated protein which is solubilized and hydrolyzed is derived from fish.

References Cited

UNITED STATES PATENTS

| | | | |
|---|---|---|---|
| 2,279,908 | 4/1942 | Ayers et al. | 195—29 |
| 2,279,911 | 4/1942 | Ayers et al. | 195—29 |
| 2,802,738 | 8/1957 | Auson | 99—14 |
| 3,127,388 | 3/1964 | Johnson et al. | 195—29 |
| 3,170,794 | 2/1965 | Jeffreys et al. | 99—14 |
| 3,303,182 | 2/1967 | Sakai et al. | 99—17 |

RAYMOND N. JONES, Primary Examiner

U.S. Cl. X.R.

99—1, 14, 17, 28, 83, 85, 90 HP, 124, 139; 195—63